(12) United States Patent
Melack et al.

(10) Patent No.: US 10,573,920 B2
(45) Date of Patent: Feb. 25, 2020

(54) BATTERY ASSEMBLY TECHNIQUES (71) Applicant: Wisk Aero LLC, Mountain View, CA (US)

(72) Inventors: John Melack, Redwood City, CA (US); Thomas P. Muniz, Sunnyvale, CA (US); Nihal Murthy, San Francisco, CA (US)

(73) Assignee: WISK AERO LLC, Mountain View, CA (US)

( * ) Notice: Subject to any disclaimer, the term of this patent is extended or adjusted under 35 U.S.C. 154(b) by 0 days.

(21) Appl. No.: 15/908,556

(22) Filed: Feb. 28, 2018

(65) Prior Publication Data

US 2018/0191020 A1    Jul. 5, 2018

Related U.S. Application Data

(63) Continuation of application No. 15/471,947, filed on Mar. 28, 2017, now Pat. No. 9,941,542.

(60) Provisional application No. 62/395,594, filed on Sep. 16, 2016.

(51) Int. Cl.
*H01M 10/04* (2006.01)
*H01M 6/00* (2006.01)
*H01M 6/42* (2006.01)
*H01M 2/02* (2006.01)

(52) U.S. Cl.
CPC ..... *H01M 10/0481* (2013.01); *H01M 2/0285* (2013.01); *H01M 6/42* (2013.01); *H01M 10/0404* (2013.01); *H01M 10/049* (2013.01)

(58) Field of Classification Search
None
See application file for complete search history.

(56) References Cited

U.S. PATENT DOCUMENTS

| | | |
|---|---|---|
| 4,778,479 A | 10/1988 | Romling |
| 5,407,450 A | 4/1995 | Rose |
| 6,190,797 B1 | 2/2001 | Miyagi |

(Continued)

FOREIGN PATENT DOCUMENTS

| | | |
|---|---|---|
| CN | 109690822 | 4/2019 |
| JP | 2005190748 | 7/2005 |

(Continued)

OTHER PUBLICATIONS

International Search Report and Written Opinion—PCT/US2017/024585—ISA/EPO—Jun. 15, 2017.

*Primary Examiner* — Jonathan Crepeau
(74) *Attorney, Agent, or Firm* — Kilpatrick Townsend & Stockton LLP (57) ABSTRACT

Battery assembly techniques and a corresponding system are disclosed. In various embodiments, the battery assembly techniques include compressing battery cells and inserting the battery cells in a can. Battery cells are stacked and then compressed using pneumatic cylinders that exert pressure on a first external layer of the stacked battery cells. A first portion of the stacked battery cells is released from the pneumatic cylinders while a second portion of the battery cells remains compressed. The first portion of the stacked battery cells is inserted in a can. In various embodiments, friction decreasing materials are added to the stacked battery cells to compress the stacked battery cells or ease insertion.

14 Claims, 11 Drawing Sheets

(56) References Cited

U.S. PATENT DOCUMENTS

| | | | |
|---|---|---|---|
| 9,941,542 B1 * | 4/2018 | Melack | H01M 2/0285 |
| 2004/0127952 A1 | 7/2004 | O'Phelan | |
| 2014/0087231 A1 | 3/2014 | Schaefer | |

FOREIGN PATENT DOCUMENTS

| | | |
|---|---|---|
| WO | WO8802930 | 4/1988 |
| WO | 2018052486 | 3/2018 |

* cited by examiner

BATTERY ASSEMBLY TECHNIQUES

CROSS REFERENCE TO OTHER APPLICATIONS

This application is a continuation of co-pending U.S. patent application Ser. No. 15/471,947, entitled BATTERY ASSEMBLY TECHNIQUES filed Mar. 28, 2017 which is incorporated herein by reference for all purposes, which claims priority to U.S. Provisional Application No. 62/395,594, entitled BATTERY SUBMODULE AND ASSEMBLY TECHNIQUES filed Sep. 16, 2016 which is incorporated herein by reference for all purposes.

BACKGROUND OF THE INVENTION

Proper battery assembly is integral to producing safe, high quality battery packs. Placing a plurality of pouch cells into a battery case while maintaining compression on the cells may be required during battery assembly. A method that is automated may improve upon the assembly process. Additional design features which reduce friction between the plurality of pouch cells and the battery case may improve upon the assembly process.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A battery assembly method and system are disclosed. The battery assembly method comprises stacking a plurality of battery cells to create a stack of battery cells and compressing the stack of battery cells. Compressing the stack of battery cells comprises exerting pressure on a first external layer of the stack of battery cells using a plurality of pneumatic cylinders. A first portion of the stack of battery cells is released from the plurality of pneumatic cylinders while a second portion of the stack of battery cells remains compressed by the plurality of pneumatic cylinders. The first portion of the stack of battery cells is inserted in a can. The battery cells may retain compression while being inserted in the can. The process may repeat until the stack of battery cells is fully inserted in the can. The battery assembly system carries out the battery assembly method. In some embodiments, the stack of battery cells comprises insulation, conductors, or both in addition to cells. A plurality of pneumatic cylinders may exert pressure on a second external layer of the stack of battery cells.

In some embodiments, the battery assembly system enables a battery to be assembled efficiently and accurately. A battery may require compressing layers of cells and other contents before inserting them in a fully sealed case (e.g. a can). The battery assembly system may decrease friction and resistance typical in inserting one or more of the following: battery cells, insulation, or conductors, in the can. An apparatus comprising pneumatic cylinders may be used to compress the battery cells. The pneumatic cylinders may allow the battery cells to be inserted portion by portion into the can, wherein portions of the battery cells that are not near the opening of the can remain compressed by the pneumatic cylinders. In some embodiments, the battery cells are compressed while held in a stacking fixture. The stacking fixture is removed following compression and the battery cells are inserted in the can. In some embodiments, pneumatic cylinders are installed on structures that move the cylinders in a direction perpendicular to the cylinders' active direction (e.g. the direction in which the cylinders exert pressure), allowing the cylinders to drop the battery cells into the can. In various embodiments, various configurations of friction decreasing materials may be used such as cell covers or bands. Banding may also serve to compress the cells and enable easier insertion into the can.

Figure 1A:
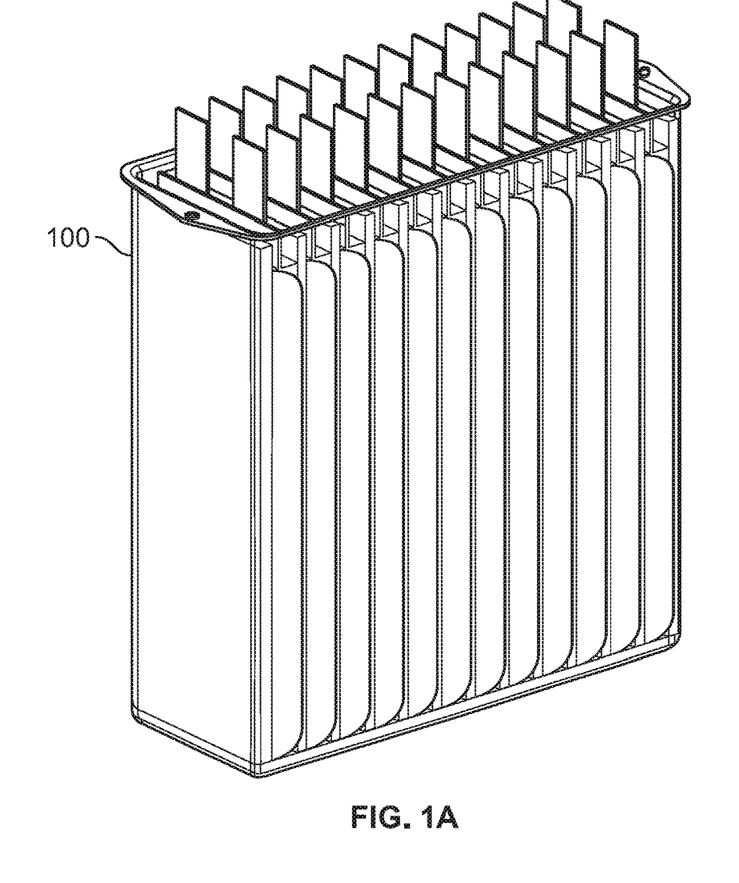
FIG. 1A is a diagram illustrating an embodiment of a battery.

FIG. 1A is a diagram illustrating an embodiment of a battery. The battery assembly system may be used to assemble various types of batteries. Battery 100 illustrates an embodiment of a battery assembled by the system. The battery as shown comprises stacked components enclosed in a sealed can assembly. The can may be used as a heat sink and may comprise aluminum or any other appropriate material. The can may be sealed to the battery pack structure. The can may comprise an opening wherein the battery cells are inserted. In some embodiments, a cover is placed at the can's opening after the battery cells are inserted to create a fully sealed battery.

Figure 1B:
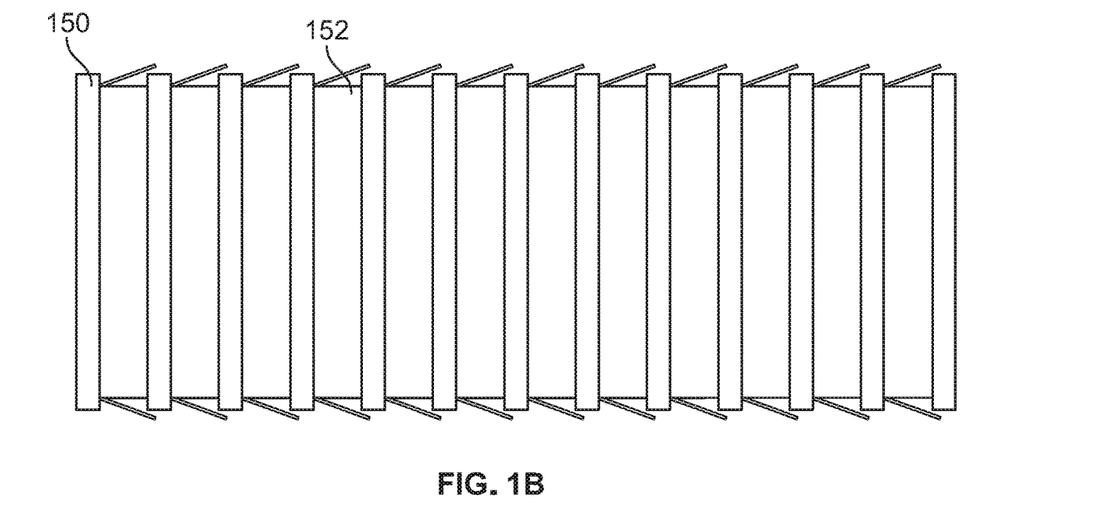
FIG. 1B is a diagram illustrating an embodiment of a battery from a top view.

FIG. 1B is a diagram illustrating an embodiment of a battery from a top view. Alternating layers of the battery components are shown. Thermal runaway propagation prevention features are built into the battery design.

A battery cell stack may comprise non-cell layers. Thermal insulation, conductors, and cells may be stacked in the can. Layers of cells may be placed in between layers of insulation. Insulation layer 150 may comprise an aerogel, fiberglass, fiberglass infused with aerogel, or any appropriate insulating material. The insulation shown in this embodiment is a compressible material. In some embodiments, aluminum fins are placed in between cells. The fins may provide thermal contact. Cell layer 152 may comprise a liquid electrolyte. In some embodiments, the battery assembly system aligns the stacked layers of the battery and fits the stacked and aligned layers into the can. The components of the battery may be required to be compressed and tightly secured in the can.

Figure 2:
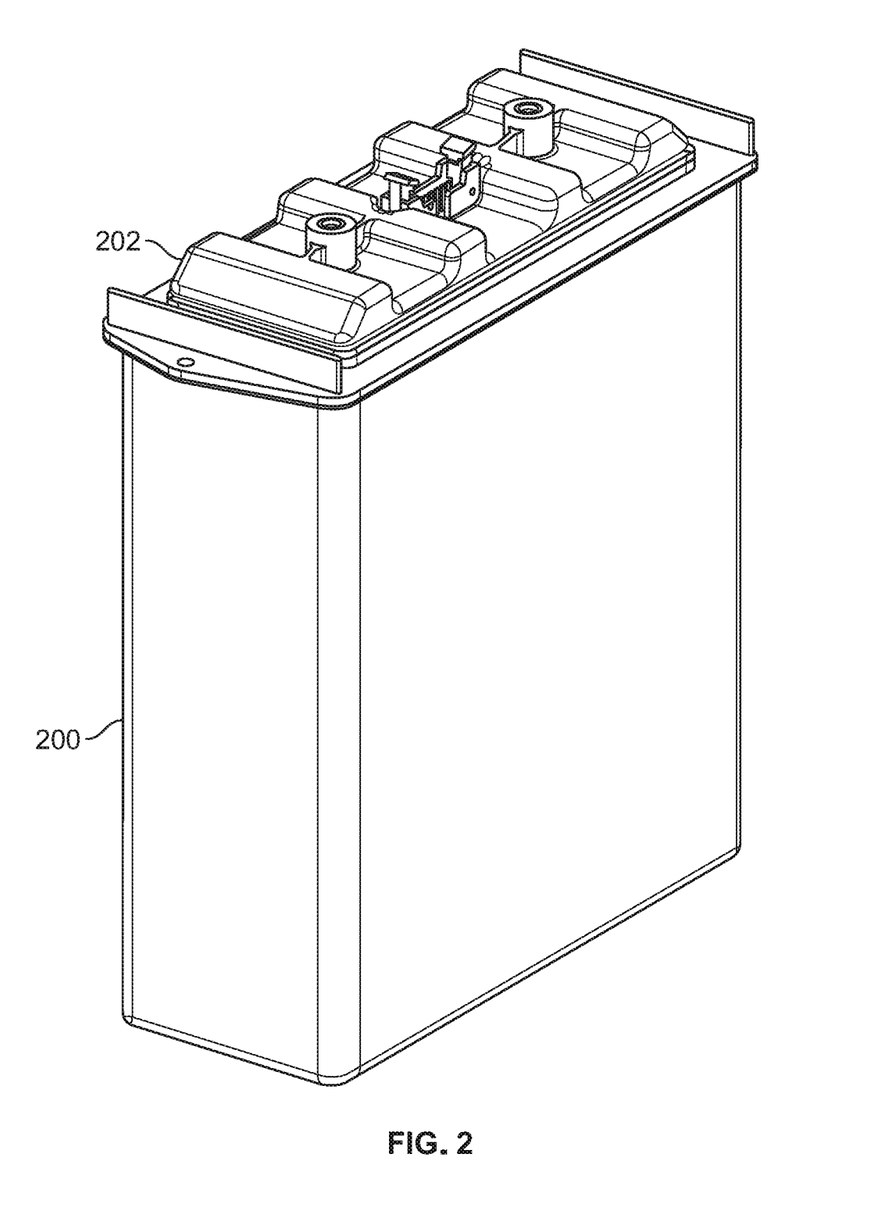
FIG. 2 is a diagram illustrating an embodiment of a sealed battery.

FIG. 2 is a diagram illustrating an embodiment of a sealed battery. Cover 202 is sealed to can 200. The diagram shows an embodiment of a final assembled battery. Can 200 may comprise an impact extruded can. Cells are stacked in the can. In some embodiments, the can is made of 1070 T0 aluminum. The can has 0.024" wall thickness and $\frac{1}{16}$" bottom thickness. The can has a flanged top for sealing. After assembly, the can may be compressed for proper cell compression.

The can may be plastically formed in a fixture to provide specified cell compression (e.g., 3 PSI). The insulation may act as a spring to provide a specified cell compressive force. The compression may secure the cells (e.g., no load on the tabs) and improve cell cycle life. The battery assembly system may be required to compress the battery component stack in order to insert it into the can.

Figure 3A:
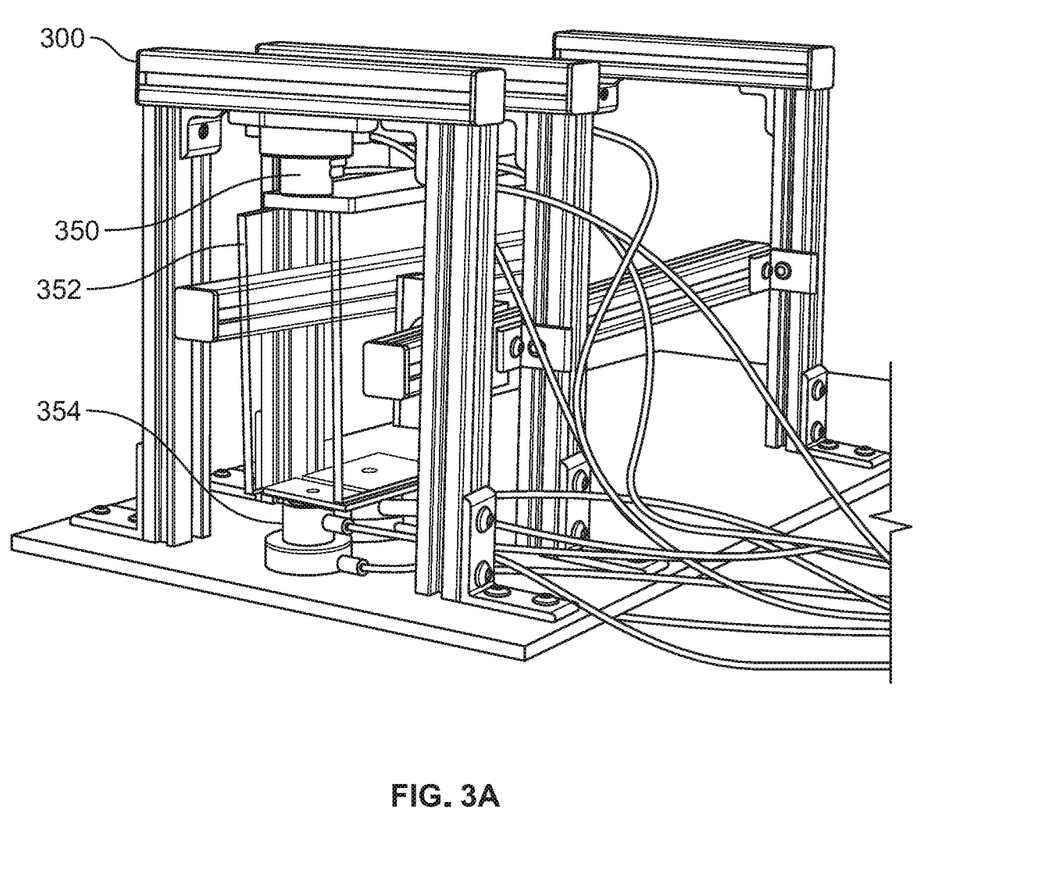
FIG. 3A is a diagram illustrating an embodiment of a battery assembly system.

FIG. 3A is a diagram illustrating an embodiment of a battery assembly system. In the example shown, system 300 comprises stacking fixture 352, pneumatic cylinder 350, and pneumatic cylinder 354. Stacking fixture 352 may comprise plastic, glass, polytetrafluoroethylene, polyoxymethylene, Delrin®, or any appropriate material that does not bind to a battery case.

Various configurations of stacking fixtures may be used. The stacking fixture may be used to align or maintain alignment of the layers of the battery during compression. As shown, stacking fixture 352 is a rectangular prism shape with open panels. The stacking fixture may comprise two parallel vertical panels. In various embodiments, the stacking fixture comprises one connected apparatus or multiple moving components. The battery assembly system may comprise interchangeable parts. For example, a user may choose between various stacking fixture configurations. The stacking fixture may comprise a frame or case based on the shape of the plurality of battery cells or layers. For example, the stacking fixture may fit the dimensions of stack of battery cells. The stack of battery cells may comprise insulating or conducting layers in addition to cells.

Pneumatic cylinder 350 as shown is positioned above the battery cells and pneumatic cylinder 354 is positioned below the battery cells. Layers of the battery (e.g. cells, insulation, or conductors) may be stacked in the stacking fixture. The pneumatic cylinders may be used to exert pressure on the top and bottom battery layers, compressing the cells of the battery. In some embodiments, multiple pneumatic cylinders are used to compress the cells from both sides. For example, multiple pneumatic cylinders may press down on the top of the cell stack while multiple pneumatic cylinders exert pressure on the bottom of the cell stack.

Figure 3B:
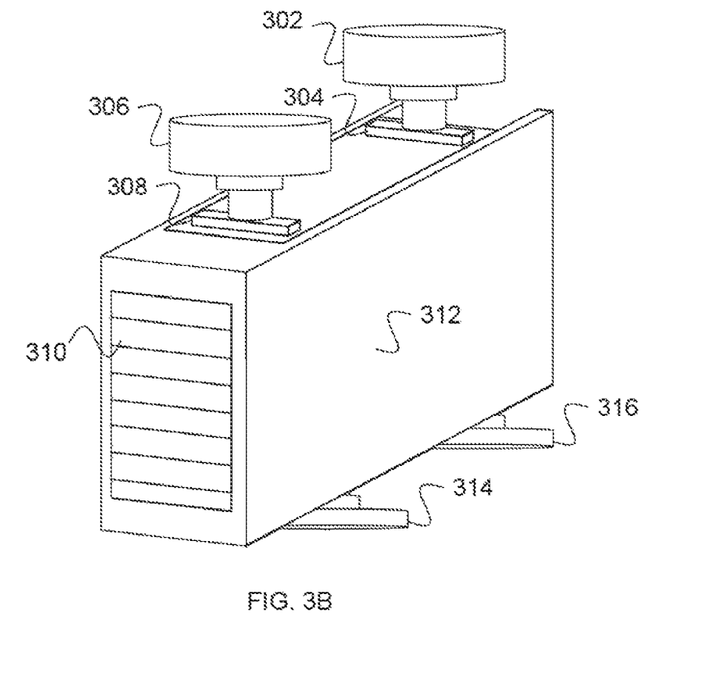
FIG. 3B is a diagram illustrating an embodiment of a battery assembly system before compression.

FIG. 3B is a diagram illustrating an embodiment of a battery assembly system before cell compression. In the example shown, stacking fixture 312 is one piece. The shape of the stacking fixture comprises two rectangular panels that are appended to a hollow rectangular prism. Cells 310 are stacked in the stacking fixture. Cells 310 may comprise the layers of the battery, including any non-cell layers.

The two solid side panels may be used to prevent cells or layers of the battery from sliding out of position. The hollow rectangular prism at one end of the stacking fixture may be used to align the battery cells. In the example shown, pneumatic cylinders 302 and 306 press down upon components 308 and 304 respectively. Components 308 and 304 may be designed to evenly press down upon the battery cells. For example, they may be evenly spaced across the topmost layer or their lengths may be equal to the exposed width of the topmost layer of the battery cell stack. The components may be semi-permanently attached to the pneumatic cylinders. Pneumatic cylinders 314 and 316 may also similarly compact the battery cell stack from below.

Figure 3C:
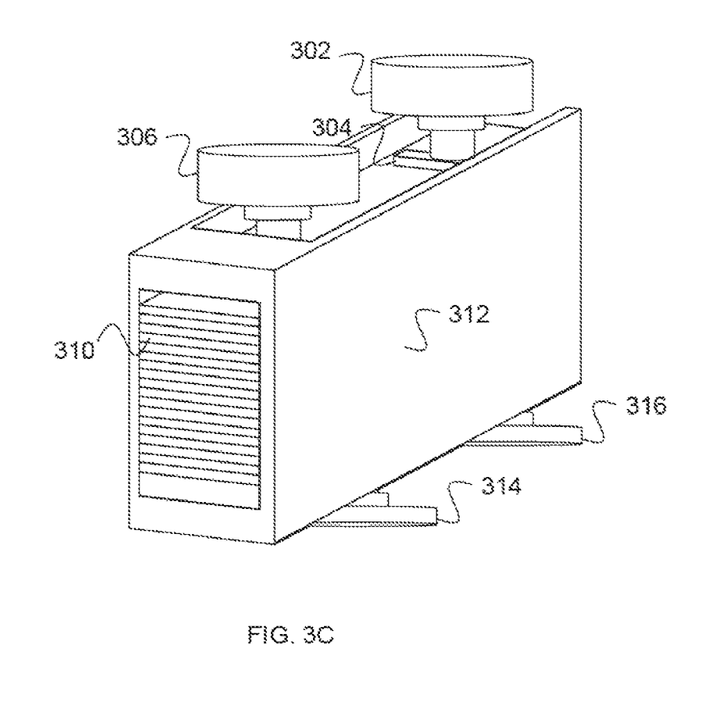
FIG. 3C is a diagram illustrating an embodiment of a battery assembly system in the process of compression.

FIG. 3C is a diagram illustrating an embodiment of a battery assembly system in the process of battery compression. In the example shown, pneumatic cylinders 302 and 306 push down on the top layer of battery cells 310. Battery cells 310 are compressed compared to the previous position in FIG. 3B. Pneumatic cylinders 314 and 316 have advanced the bottom layer of battery cells 310 upwards compared to the previous position in FIG. 3B. Battery cells 310 are compacted smaller than the dimensions of stacking fixture 312. Following compression, the stacking fixture may be removed.

Figure 3D:
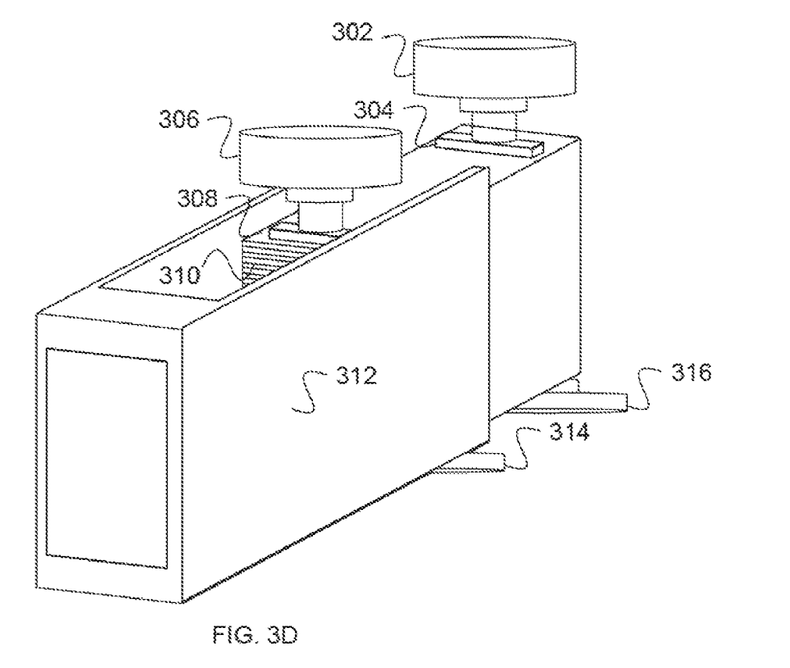
FIG. 3D is a diagram illustrating an embodiment of a removal of a stacking fixture.

FIG. 3D is a diagram illustrating an embodiment of a removal of a stacking fixture. Following compression, stacking fixture 312 may be removed from its hollow rectangular prism side. The stacking fixture may slide easily off of the compacted battery cells. As shown, stacking fixture 312 is halfway removed from battery cells 310. Pneumatic cylinders 306, 302, 314, and 316 remain in contact with and compress battery cells 310.

Figure 3E:
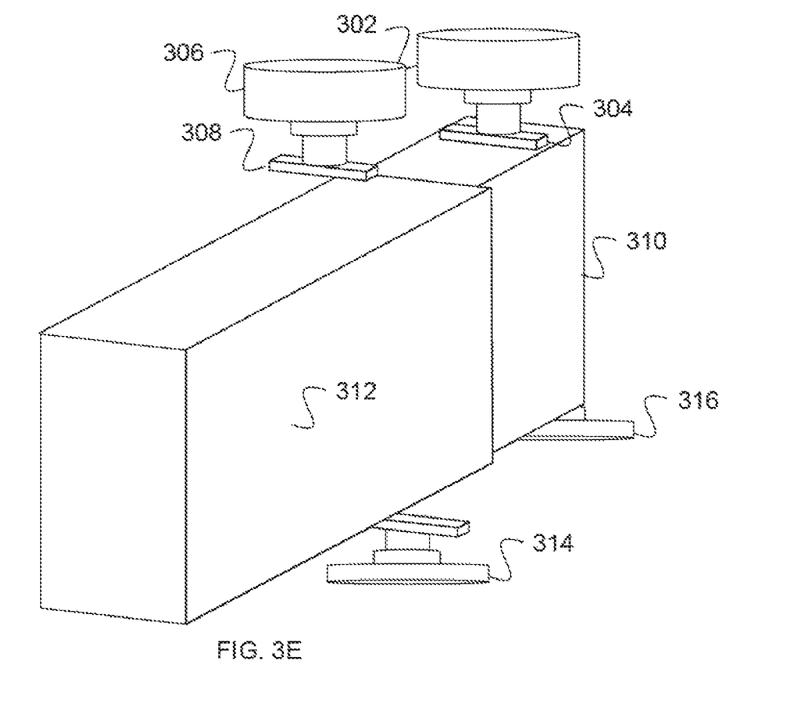
FIG. 3E is a diagram illustrating an embodiment of insertion in a can.

FIG. 3E is a diagram illustrating an embodiment of insertion into a can. The assembly system may compress the cells of the battery into a compact shape that is able to slide into a can. The system may solve the difficult assembly step of transferring cells from a fixture to the can. As shown, can 312 is slid on to battery cells 310. As the can is advanced, the nearest pneumatic cylinders are retracted. In various embodiments, the can is advanced towards the stack of battery cells or the stack of battery cells is advanced towards the can. Other pneumatic cylinders may remain in position, compressing the battery cells, until the can is advanced to the pneumatic cylinders. As shown, battery cells 310 are halfway inserted in can 312. Pneumatic cylinders 306 and 314 are retracted. Pneumatic cylinders 302 and 316 remain in contact with the battery cells. In some embodiments, 6, 10, or any appropriate number of pneumatic cylinders may be utilized.

In some embodiments, a first portion of the stacked battery cells is released from pneumatic cylinders prior to being inserted in the can. For example, pneumatic cylinders 306 and 314 may be released before the can is advanced on the first portion of the stacked battery cells. In some embodiments, a portion of the stacked battery cells is inserted prior to being released by the pneumatic cylinders. For example, can 312 may be advanced up to component 304. After advancing the can, pneumatic cylinders 302 and 316 may release the portion of the stacked battery cells.

Figure 4A:
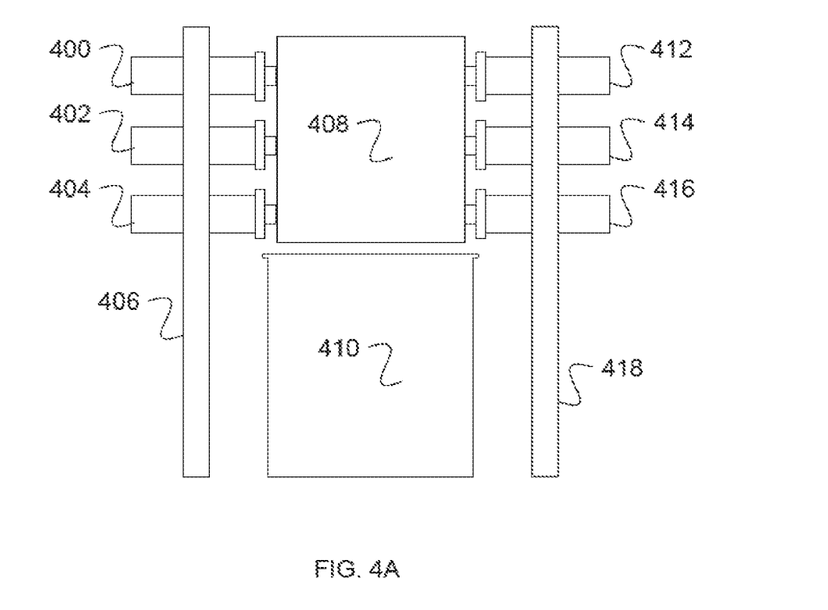
FIG. 4A is a diagram illustrating an embodiment of a battery assembly system before insertion in a can.

FIG. 4A is a diagram illustrating an embodiment of a battery assembly system before insertion in a can. A battery assembly system may simultaneously compress the battery cells and insert them into a can. In the example shown, battery cells 408 are lowered into can 410. Battery cells 408 are compressed between pneumatic cylinders. Pneumatic cylinders 400, 402, and 404 are supported by structure 406 and exert pressure on one side of the battery cells. Pneumatic cylinders 412, 414, and 416 are supported by structure 418 and exert pressure on an opposite side of the battery cells. Compressing the battery cells while inserting them into a can may allow the battery cells to be inserted quickly or preserve alignment of the cells.

Figure 4B:
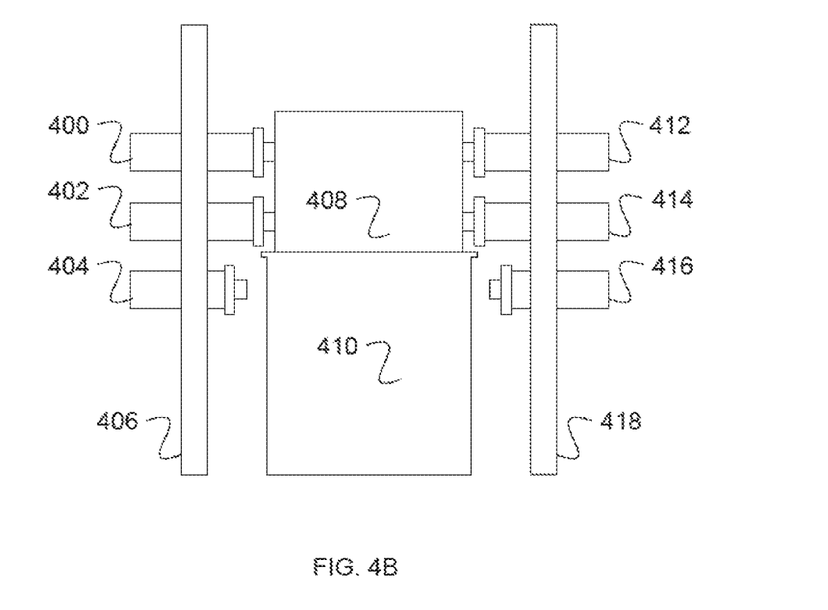
FIG. 4B is a diagram illustrating an embodiment of a battery assembly system during insertion in a can.

FIG. 4B is a diagram illustrating an embodiment of a battery assembly system during insertion in a can. Battery cells 408 are partially inserted into can 410. Pneumatic cylinders 400, 402, and 404 may be moved up and down via structure 406. In various embodiments, the structure, the pneumatic cylinders, or both the structure and pneumatic cylinders may be repositioned to lower the battery into the can. Pneumatic cylinders 412, 414, and 416 may similarly move up and down via structure 418. As the battery cells as lowered, pneumatic cylinders nearest the can may retract. The pneumatic cylinders may be retracted in pairs. As shown, pneumatic cylinders 404 and 416 are retracted. The portion of the battery cells that were compressed by pneumatic cylinders 404 and 416 are inserted in the can. The battery cells may be lowered one portion of the battery cells at a time. The battery cells that are not yet in the can may remain compressed by pneumatic cylinders. For example, pneumatic cylinders 400, 402, 412, and 414 as shown compress battery cells 408. The final portion of the battery cells may be firmly pushed into the can. The battery assembly system may allow the battery cells to remain actively compressed for as long as possible during insertion of the cells into the can.

Figure 5:
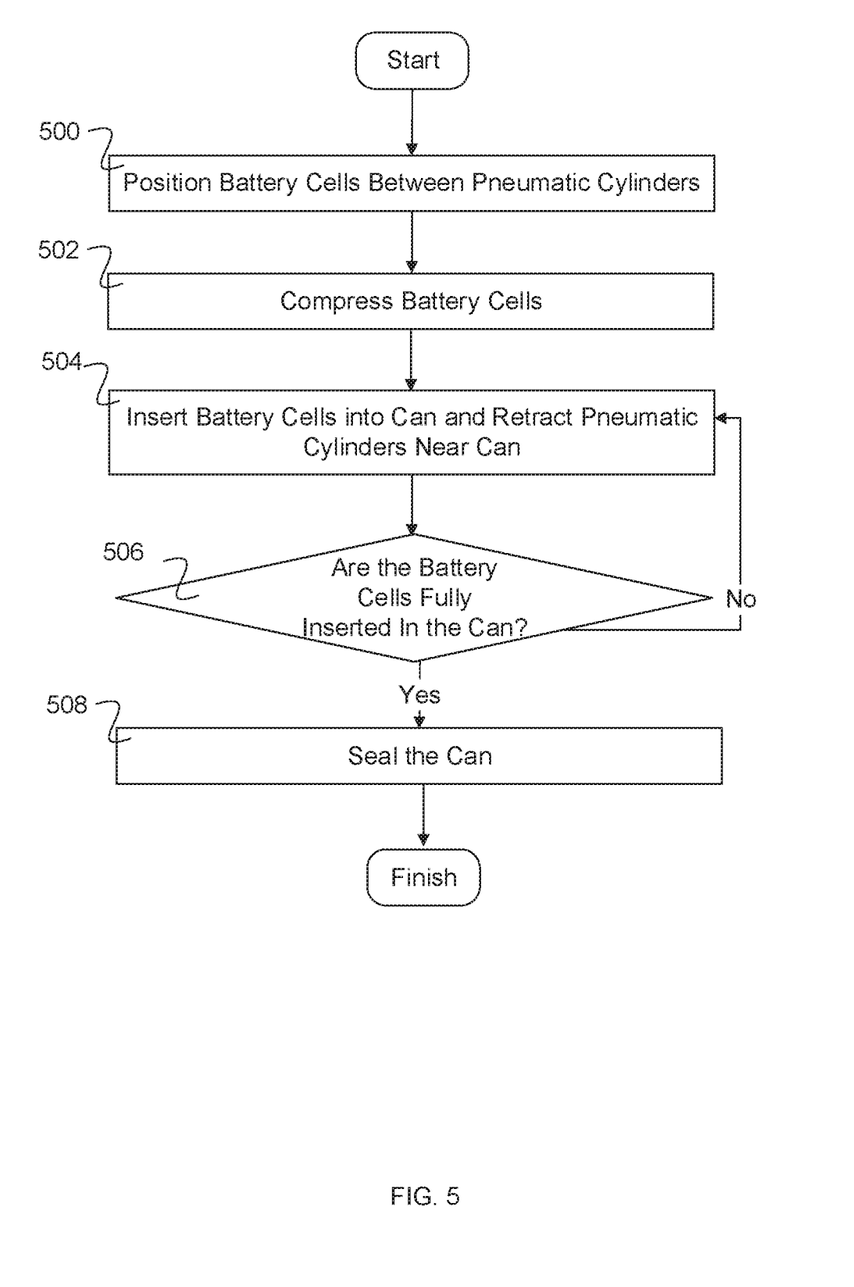
FIG. 5 is a flow diagram illustrating an embodiment of a battery assembly process.

FIG. 5 is a flow diagram illustrating an embodiment of a process for battery assembly. In some embodiments, the compression and insertion of the battery cells occur simultaneously. A combination compression and insertion apparatus may be used.

In 500, the battery cells are positioned between pneumatic cylinders. In 502, the battery cells are compressed. In 504, the battery cells are inserted into a can and pneumatic cylinders near the can are retracted. For example, the pneumatic cylinders that are closest to an opening in the can may be retracted. In 506, it is determined whether the battery cells are fully inserted into the can. In the event the battery cells are determined to be fully inserted into the can, in 508 the can is sealed. Sealing the can may comprise inserting a top plate comprising a thermistor, cell interconnects, or latches. A tab cover may be sealed over the top plate using an adhesive or solvent bond. Following 508, the process is finished. In the event the battery cells are determined to be not fully inserted into the can, the process returns to 504.

Figure 6:
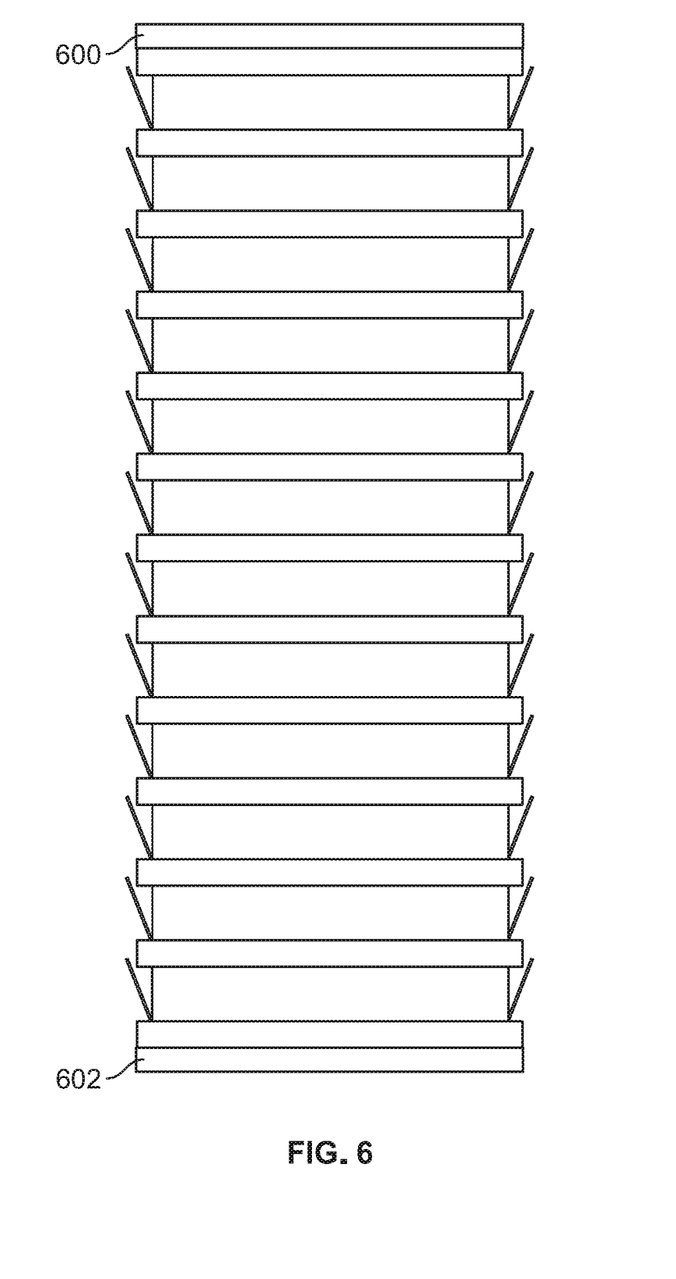
FIG. 6 is a diagram illustrating an embodiment of a battery comprising low friction cell covers.

FIG. 6 is a diagram illustrating an embodiment of a battery comprising low friction cell covers. The battery may comprise components that enable the battery to be assembled efficiently. In some embodiments, the battery cell stack may bind to the can or create friction as it is inserted. For example, insulating layers made with aerogel (e.g. fiberglass infused with aerogel) may be binding, causing uneven insertion into the can. Low friction cell covers may allow the battery cells to slide easily into a can. Low friction cell covers may be placed as the first and final layers of the battery cell stack. The low friction cell covers may comprise a slippery material, such as a plastic, polytetrafluoroethylene, polyoxymethylene, Delrin®, or any other appropriate material. The low friction cell cover may comprise insulating properties to prevent melting or fire. For example, the low friction cell cover may comprise a slick material with an insulating coating such as intumescent paint. Intumescent materials may provide energy absorption due to phase change. Intumescent paint or additives may be used. As shown, low friction cell covers 600 and 602 are placed on either end of the stacked battery cells.

Figure 7:
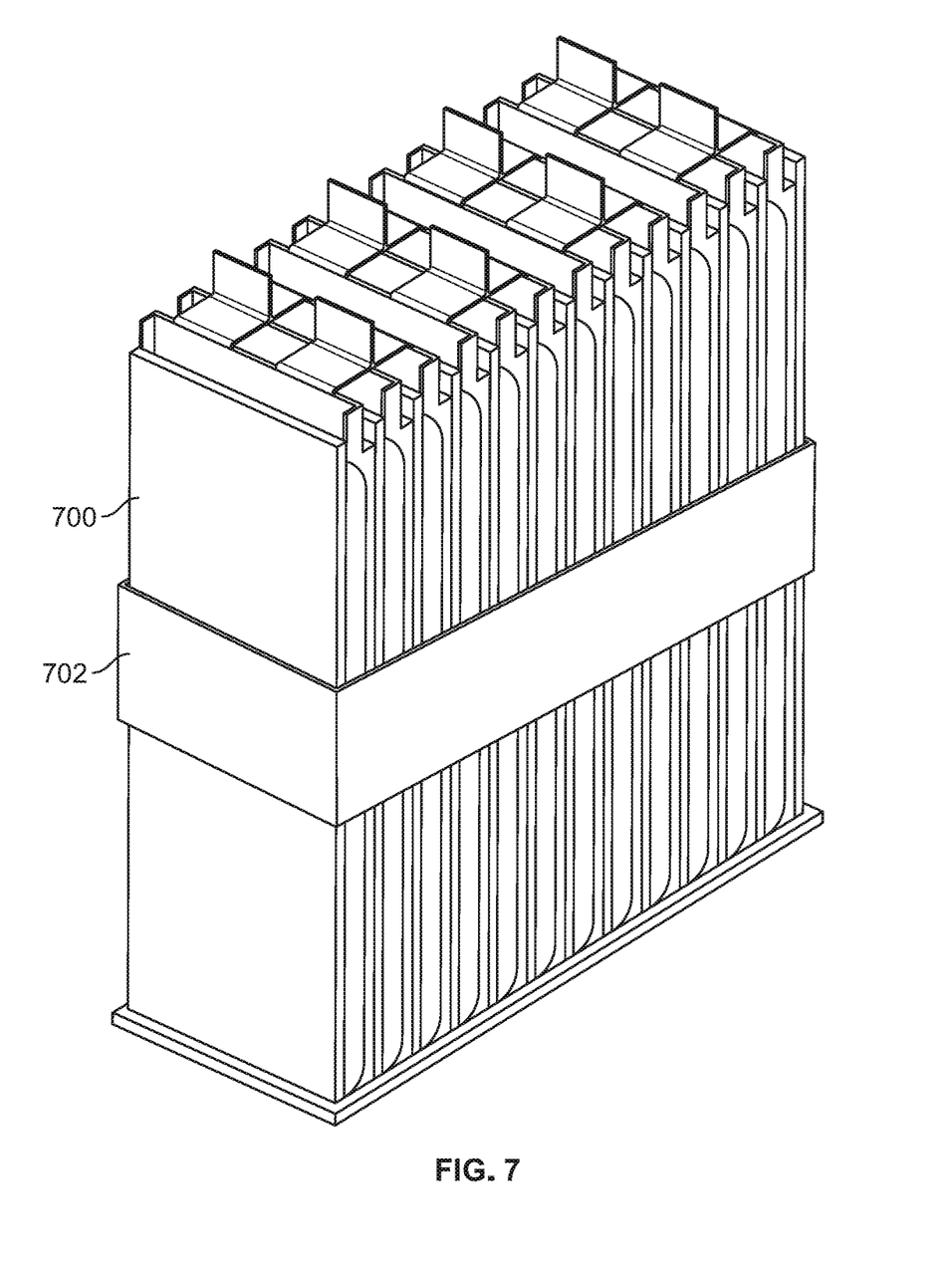
FIG. 7 is a diagram illustrating an embodiment of a low friction band.

FIG. 7 is a diagram illustrating an embodiment of a low friction band. A low friction band may compress a battery cell stack and allow it to be inserted into a can smoothly. In the example shown, low friction band 207 is wrapped around battery cells 700. Low friction band 207 may comprise a low friction material such as a plastic, polytetrafluoroethylene, polyoxymethylene, Delrin®, or any appropriate material. The low friction material may be coated in an insulating material such as intumescent paint. In some embodiments, the low friction band compresses the battery cell stack. The low friction may band may enable the battery cells to maintain compression and also slide easily into the can. The low friction band or low friction cell covers may be applied manually or automatically to the battery cells. For example, an off the shelf banding machine may be used.

Figure 8:
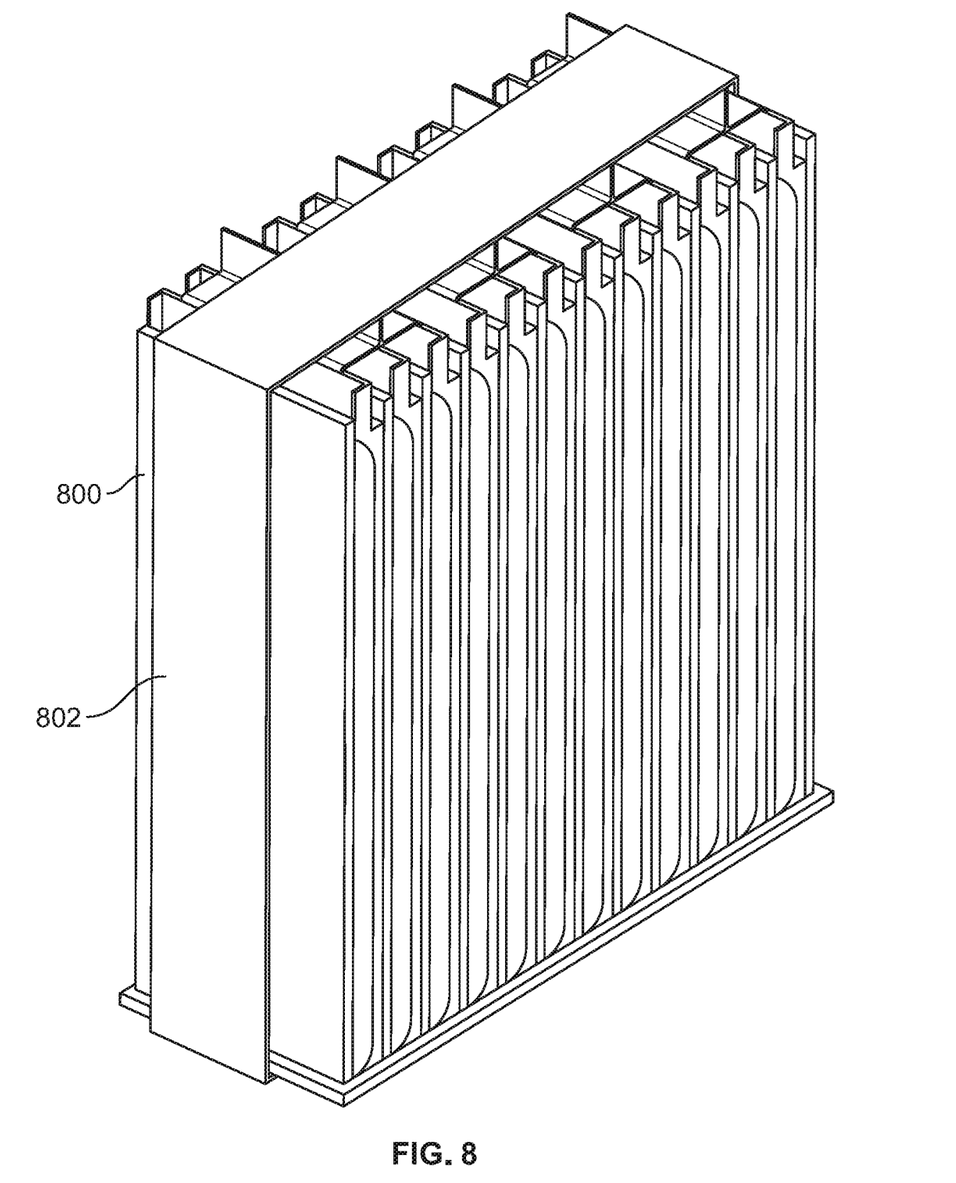
FIG. 8 is a diagram illustrating an embodiment of a low friction band.

FIG. 8 is a diagram illustrating an embodiment of a low friction band. As shown, low friction band 802 is wrapped around battery cells 800. The low friction band as shown is wrapped vertically around the battery cells. In some embodiments, wrapping the band vertically allows metal fins on either side of the battery layers to efficiently disperse heat from the battery. Wrapping the band vertically may also allow additional low friction material to be present on the first and last stacks of the band compared to wrapping the band horizontally around the battery cells. In some embodiments, a low friction band is an extension of low friction cell covers. For example, the low friction cell covers may continue to loop around the entire stack of battery cells.

Figure 9:
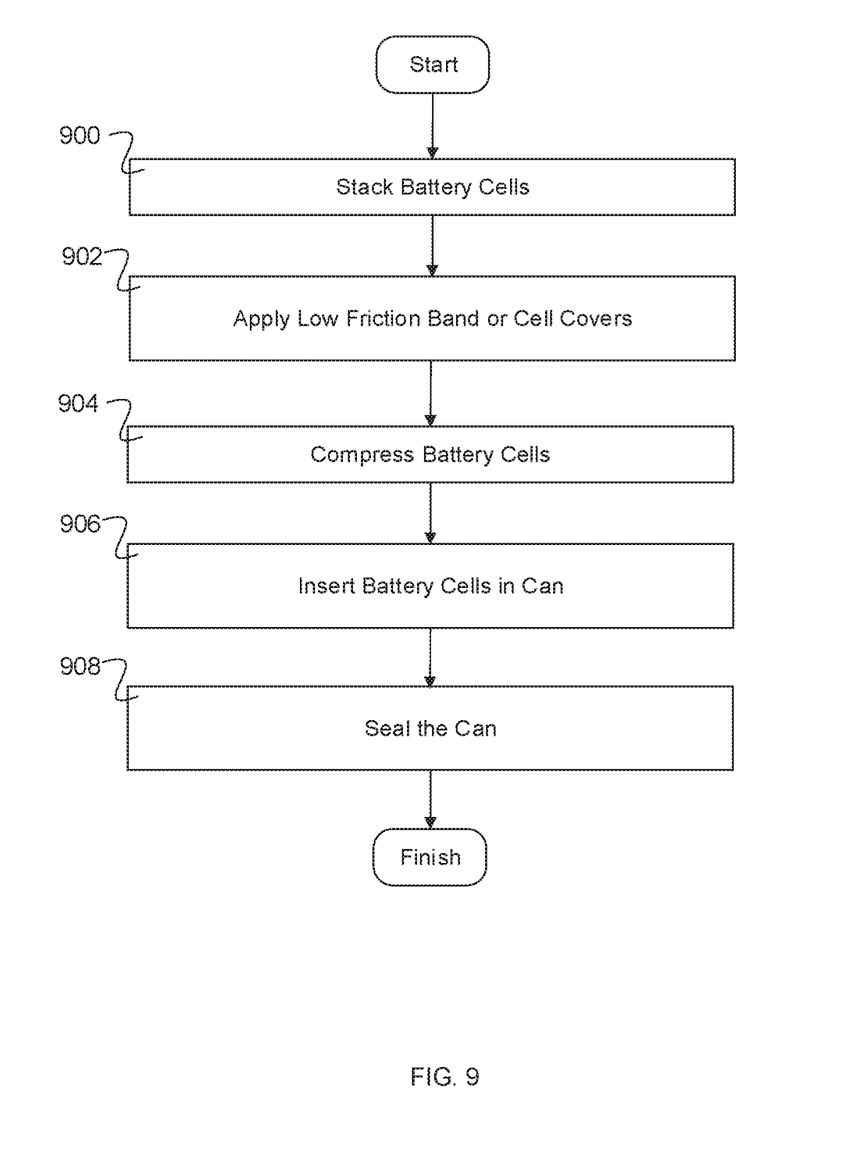
FIG. 9 is a flow diagram illustrating an embodiment of a battery assembly process.

FIG. 9 is a flow diagram illustrating an embodiment of a battery assembly process. In 900, the battery cells are stacked. In 902, a low friction band or cell covers are applied. Various friction decreasing components may be used separately or in combination. For example, a horizontal low friction band may be used in addition to low friction cell covers. In 904, the battery cells are compressed. In some embodiments, the battery cells are compressed using a low friction band. In some embodiments, an apparatus dedicated to compression is used. In 906, the battery cells are inserted into a can. In 908, the can is sealed.

In some embodiments, a low friction decreasing component is removed after battery cells are inserted in the can. For example, low friction cell covers may be removed from the can after battery cells are inserted in the can.

In various embodiments, a friction decreasing component and assembly apparatus are used in combination or separately. For example, a battery cell stack may be compressed and inserted into a can solely using a low friction band. A battery cell stack may be compressed using a stacking fixture and inserted into a can without extra friction decreasing measures. Following compression using the apparatus of FIG. 3B, the compressed battery cells may be sealed with a band. The battery cells may then be removed from the pneumatic cylinders and inserted in a can.

In some embodiments, the battery assembly system is automated. The system may comprise an interface and processor. Desired specifications such as compression level, number of pneumatic cylinders used, spacing of pneumatic cylinders, speed of assembly, or any other appropriate factor may be provided to the system via the interface. For example, the user may specify how fast the battery is dropped or how fast the pneumatic cylinders are retracted. Stacking the battery cells, inserting the battery cells into a can, and/or sealing the can may be automated.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A battery assembly method, comprising:
   stacking a plurality of battery cells in a stacking fixture to create a stack of battery cells;
   compressing the stack of battery cells by exerting pressure on an external layer of the stack of battery cells using a plurality of pneumatic cylinders;
   removing the stacking fixture;
   inserting a first portion of the compressed stack of battery cells in a can, prior to releasing any of the plurality of pneumatic cylinders, including by advancing the stack of battery cells into the can up to a component comprising a first one or more of the plurality pneumatic cylinders; and
   releasing the first portion of the stack of battery cells from the first one or more of the plurality of pneumatic cylinders while a second portion of the stack of battery cells remains compressed by one or more other of the plurality of pneumatic cylinders.

2. The method of claim 1, wherein the stack of battery cells comprises insulation, conductors, or both insulation and conductors.

3. The method of claim 1, wherein the stack of battery cells is positioned relative to the can.

4. The method of claim 1, wherein further portions of the stack of battery cells are inserted until the stack of battery cells are fully inserted in the can.

5. The method of claim 1, wherein the can is further sealed.

6. The method of claim 1, wherein a plurality of pneumatic cylinders exert pressure on an additional external layer of the stack of battery cells, compressing the stack of battery cells.

7. The method of claim 1, wherein alignment of the plurality of battery cells is maintained using the stacking fixture.

8. The method of claim 7, wherein the stacking fixture comprises a frame or case based on the shape of the plurality of battery cells.

9. The method of claim 1, wherein the stack of battery cells is advanced towards the can.

10. The method of claim 1, wherein a cell cover or band comprising a low friction material is added to the stack of battery cells prior to inserting the stack of battery cells in the can.

11. The method of claim 1, wherein a cell cover or band comprising a low friction material is added to the stack of battery cells prior to inserting the stack of battery cells in the can and removed following insertion of the stack of battery cells in the can.

12. The method of claim 11, wherein the low friction material is coated in an insulating material.

13. The method of claim 11, wherein the band compresses the stack of battery cells.

14. The method of claim 1, wherein a low friction band is wrapped around the stack of battery cells, parallel to a face of the external layer.

* * * * *